(12) United States Patent
Agrawal et al.

(10) Patent No.: US 12,713,409 B2
(45) Date of Patent: Aug. 18, 2026

(54) METRIC-BASED BAND COMBINATION SELECTION

(71) Applicant: QUALCOMM Incorporated, San Diego, CA (US)

(72) Inventors: Mona Agrawal, San Diego, CA (US); Arvind Vardarajan Santhanam, San Diego, CA (US); Girish Khandelwal, San Diego, CA (US); Rashmi Ranjan Mohanty, San Diego, CA (US); Vijay Marwah, San Diego, CA (US); Daniel Amerga, San Diego, CA (US); Sanjeev Athalye, San Diego, CA (US); Marc Azar, La Jolla, CA (US); Joe Thomas, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 856 days.

(21) Appl. No.: 17/752,692

(22) Filed: May 24, 2022

(65) Prior Publication Data

US 2022/0394714 A1 Dec. 8, 2022

Related U.S. Application Data

(60) Provisional application No. 63/208,213, filed on Jun. 8, 2021.

(51) Int. Cl.
*H04W 72/0453* (2023.01)
*H04W 8/24* (2009.01)
(Continued)

(52) U.S. Cl.
CPC ......... *H04W 72/0453* (2013.01); *H04W 8/24* (2013.01); *H04W 24/08* (2013.01); *H04W 72/23* (2023.01)

(58) Field of Classification Search
CPC ... H04W 72/0453; H04W 8/24; H04W 24/08; H04W 72/23; H04W 24/02; H04W 24/10; H04W 72/51; H04W 28/02
(Continued)

(56) References Cited

U.S. PATENT DOCUMENTS 10,904,937 B1 * 1/2021 Pawar .............. H04W 28/0268
2018/0343697 A1 * 11/2018 Hsu ...................... H04W 76/16
(Continued)

*Primary Examiner* — Kwang B Yao
*Assistant Examiner* — Syed M Bokhari
(74) *Attorney, Agent, or Firm* — Seyfarth Shaw LLP

(57) ABSTRACT

A method of wireless communication performed at a user equipment (UE), includes transmitting, to a network node, a first indication of a first UE radio capability, the first UE radio capability indicating support for a group of evolved universal terrestrial radio access network (E-UTRAN) new radio (NR) dual connectivity (EN-DC) band combinations. The method also includes receiving, from the network node, an indication of an active EN-DC band combination based on transmitting the first indication. The method further includes transmitting, to the network node, a second indication of a second UE radio capability based on an actual data throughput metric associated with the active EN-DC band combination satisfying a failure condition. The second UE radio capability may indicate support for one or more non-active EN-DC combinations. Each non-active EN-DC combination may be associated with a potential data throughput metric that is greater than a data throughput threshold value.

30 Claims, 8 Drawing Sheets

(51) Int. Cl.
*H04W 24/08* (2009.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2021/0051529 | A1* | 2/2021 | Yuan | H04W 4/16 |
| 2022/0104193 | A1* | 3/2022 | Humbert | H04W 28/0215 |
| 2023/0035731 | A1* | 2/2023 | Shen | H04B 1/525 |
| 2023/0292349 | A1* | 9/2023 | Lee | H04W 76/15 |
| 2023/0403111 | A1* | 12/2023 | Yang | H04W 72/0453 |
| 2024/0236776 | A1* | 7/2024 | Gupta | H04W 36/0069 |

* cited by examiner

METRIC-BASED BAND COMBINATION SELECTION

CROSS-REFERENCE TO RELATED APPLICATION

The present application claims the benefit of U.S. Provisional Patent Application No. 63/208,213, filed on Jun. 8, 2021, and titled "METRIC-BASED BAND COMBINATION SELECTION," the disclosure of which is expressly incorporated by reference in its entirety.

TECHNICAL FIELD

This disclosure relates generally to wireless communication, and specifically, to dynamically updating supported band combinations based on metric observations and network behavior.

DESCRIPTION OF RELATED TECHNOLOGY

Wireless communication systems are widely deployed to provide various telecommunications services such as telephony, video, data, messaging, and broadcasts. Typical wireless communication systems may employ multiple-access technologies capable of supporting communications with multiple users by sharing available system resources (for example, bandwidth, transmit power, or the like). Multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Wireless networks may support multiple radio access technologies (RATs) to improve connectivity. In some examples, a wireless network may support evolved universal terrestrial radio access network (E-UTRAN) new radio (NR) dual connectivity (EN-DC). In such examples, the wireless network may support both an E-UTRA RAT (for example, a long-term evolution (LTE) RAT) and a 5G NR RAT. Additionally, the wireless network may support multiple frequency bands for each respective RAT. In some examples, the network may configure the user equipment (UE) to communicate using a single band combination selected from multiple band combinations supported by the UE. In some examples, due to bandwidth limitations, a UE may be limited to supporting certain band combinations.

SUMMARY

In one aspect of the present disclosure, a method for wireless communication at a user equipment includes transmitting, to a network node, an indication of a first UE radio capability. The first UE radio capability may indicate support for a group of evolved universal terrestrial radio access network (E-UTRAN) new radio (NR) dual connectivity (EN-DC) band combinations. The method further includes receiving, from the network node, an indication of an active EN-DC band combination of the group of EN-DC band combinations based on transmitting the indication of the first UE radio capability. The method still further includes transmitting, to the network node, an indication of a second UE radio capability based on an actual data throughput metric associated with the active EN-DC band combination satisfying a failure condition.

Another aspect of the present disclosure is directed to an apparatus including means for transmitting, to a network node, an indication of a first UE radio capability. The first UE radio capability may indicate support for a group of EN-DC band combinations. The apparatus further includes means for receiving, from the network node, an indication of an active EN-DC band combination of the group of EN-DC band combinations based on transmitting the indication of the first UE radio capability. The apparatus still further includes means for transmitting, to the network node, an indication of a second UE radio capability based on an actual data throughput metric associated with the active EN-DC band combination satisfying a failure condition.

In another aspect of the present disclosure, a non-transitory computer-readable medium with non-transitory program code recorded thereon is disclosed. The program code is executed by a processor and includes program code to transmit, to a network node, an indication of a first UE radio capability. The first UE radio capability may indicate support for a group of EN-DC band combinations. The program code further includes program code to receive, from the network node, an indication of an active EN-DC band combination of the group of EN-DC band combinations based on transmitting the indication of the first UE radio capability. The program code still further includes program code to transmit, to the network node, an indication of a second UE radio capability based on an actual data throughput metric associated with the active EN-DC band combination satisfying a failure condition.

Another aspect of the present disclosure is directed to an apparatus for wireless communications at a UE. The apparatus includes a processor and a memory coupled with the processor. The memory may store instructions operable, when executed by the processor, to cause the apparatus to transmit, to a network node, an indication of a first UE radio capability. The first UE radio capability may indicate support for a group of EN-DC band combinations. Execution of the instructions also cause the apparatus to receive, from the network node, an indication of an active EN-DC band combination of the group of EN-DC band combinations based on transmitting the indication of the first UE radio capability. Execution of the instructions further cause the apparatus to transmit, to the network node, an indication of a second UE radio capability based on an actual data throughput metric associated with the active EN-DC band combination satisfying a failure condition.

In one aspect of the present disclosure, a method for wireless communication at a UE includes transmitting, to a first network node, an indication of a first UE radio capability, the first UE radio capability indicating support for a group of EN-DC band combinations. The method further includes receiving, from the first network node, an indication of an active EN-DC band combination of the group of EN-DC band combinations based on transmitting the indication of the first UE radio capability. The method still further includes transmitting, to a second network node, an actual data throughput metric associated with the active EN-DC band combination. The method also includes receiving, from the second network node, an indication of one or more non-active EN-DC combinations of the group of EN-DC band combinations based on transmitting the actual data throughput metric. The method further includes transmitting, to the first network node based on the actual data throughput metric satisfying a failure condition, an indication of a second UE radio capability.

Another aspect of the present disclosure is directed to an apparatus including means for transmitting, to a first network node, an indication of a first UE radio capability, the first UE radio capability indicating support for a group of EN-DC band combinations. The apparatus further includes means for receiving, from the first network node, an indication of an active EN-DC band combination of the group of EN-DC band combinations based on transmitting the indication of the first UE radio capability. The apparatus still further includes means for transmitting, to a second network node, an actual data throughput metric associated with the active EN-DC band combination. The apparatus also includes means for receiving, from the second network node, an indication of one or more non-active EN-DC combinations of the group of EN-DC band combinations based on transmitting the actual data throughput metric. The apparatus further includes means for transmitting, to the first network node based on the actual data throughput metric satisfying a failure condition, an indication of a second UE radio capability.

In another aspect of the present disclosure, a non-transitory computer-readable medium with non-transitory program code recorded thereon is disclosed. The program code is executed by a processor and includes program code to transmit, to a first network node, an indication of a first UE radio capability, the first UE radio capability indicating support for a group of EN-DC band combinations. The program code further includes program code to receive, from the first network node, an indication of an active EN-DC band combination of the group of EN-DC band combinations based on transmitting the indication of the first UE radio capability. The program code still further includes program code to transmit, to a second network node, an actual data throughput metric associated with the active EN-DC band combination. The program code also includes program code to receive, from the second network node, an indication of one or more non-active EN-DC combinations of the group of EN-DC band combinations based on transmitting the actual data throughput metric. The program code further includes program code to transmit, to the first network node based on the actual data throughput metric satisfying a failure condition, an indication of a second UE radio capability.

Another aspect of the present disclosure is directed to an apparatus for wireless communications at a UE. The apparatus includes a processor and a memory coupled with the processor. The memory may store instructions operable, when executed by the processor, to cause the apparatus transmit, to a first network node, an indication of a first UE radio capability, the first UE radio capability indicating support for a group of EN-DC band combinations. Execution of the instructions also cause the apparatus to receive, from the first network node, an indication of an active EN-DC band combination of the group of EN-DC band combinations based on transmitting the indication of the first UE radio capability. Execution of the instructions further cause the apparatus to transmit, to a second network node, an actual data throughput metric associated with the active EN-DC band combination. Execution of the instructions still further cause the apparatus to receive, from the second network node, an indication of one or more non-active EN-DC combinations of the group of EN-DC band combinations based on transmitting the actual data throughput metric. Execution of the instructions also cause the apparatus to transmit, to the first network node based on the actual data throughput metric satisfying a failure condition, an indication of a second UE radio capability.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only some aspects of this disclosure and are therefore not to be considered limiting of its scope, for the description may admit to other equally effective aspects. The same reference numbers in different drawings may identify the same or similar elements.

DETAILED DESCRIPTION

Figure 1:
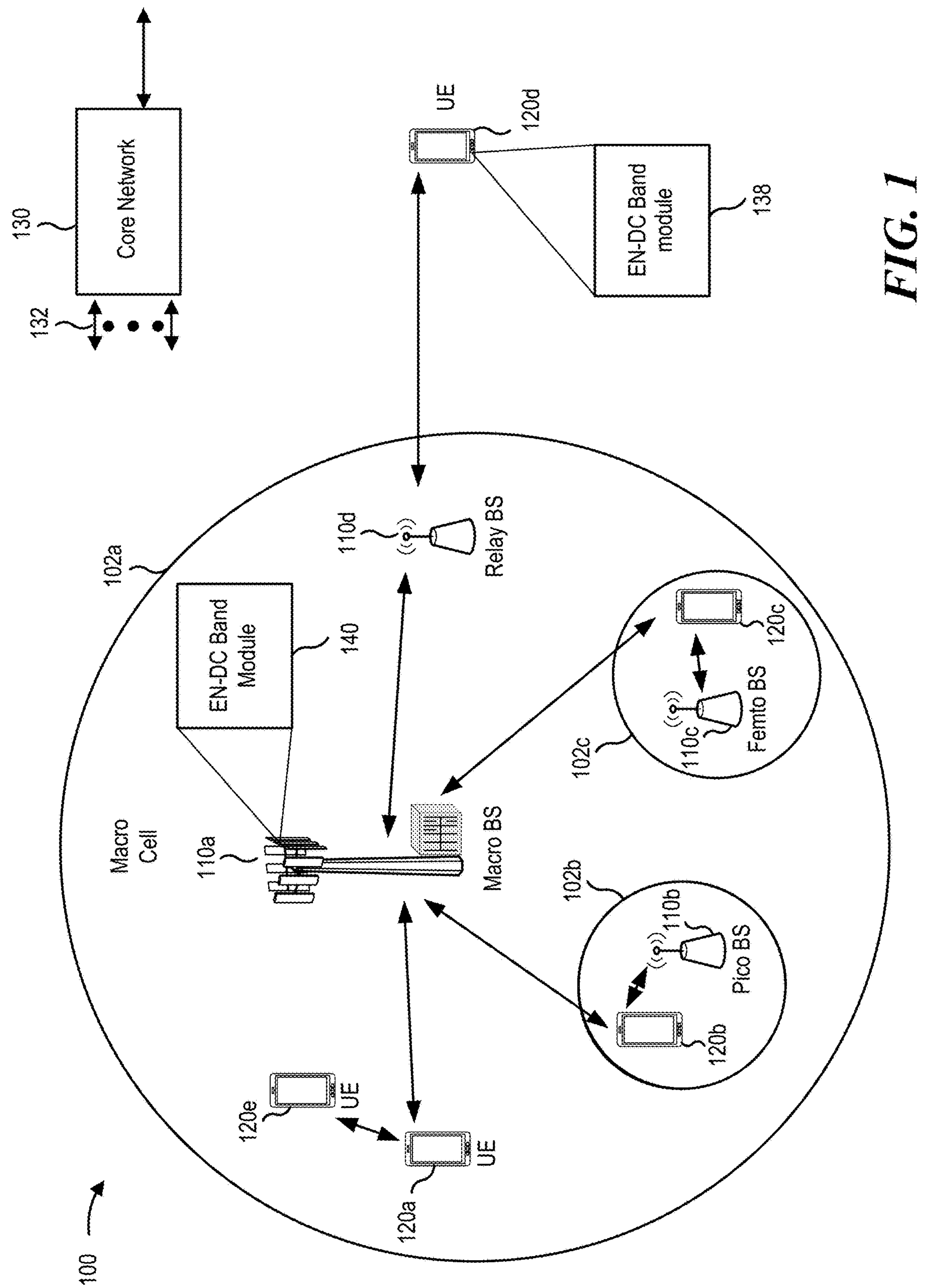
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to a person having ordinary skill in the art. Based on the teachings, a person having ordinary skill in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

Wireless networks may support multiple radio access technologies (RATs) to improve connectivity. In some examples, a wireless network may support evolved universal terrestrial radio access network (E-UTRAN) new radio (NR) dual connectivity (EN-DC). In such examples, the wireless network may support both an E-UTRA RAT (for example, a long-term evolution (LTE) RAT) and a 5G NR RAT. Additionally, the wireless network may support multiple frequency bands for each respective RAT to account for different network environments. Additionally, a user equipment (UE) may advertise a UE radio capability indicating various band combinations supported by the UE. In some examples, the network may configure the UE to communicate in a specific band combination from multiple band combinations supported by the UE based on the UE's network coverage. In some such examples, the network may select the band combination associated with a highest frequency NR band from the band combinations advertised by the UE based on the UE's network coverage satisfying coverage criteria. The coverage criteria may be satisfied based on NR coverage being equal to or greater than a coverage threshold.

The band combinations supported by a UE may be examples of EN-DC band combinations. In some examples, a band combination may identify a single supported LTE band and one or more supported NR bands. In some other examples, the band combination may identify a single supported NR band. Each supported band may support one or more component carriers. In some examples, the supported LTE band may support multiple LTE multiple-input multiple-output (MIMO) layers. The one or more supported NR bands may include one or both of a frequency domain division (FDD) band or a time domain division (TDD) band. In some examples, due to limits on an amount of bandwidth allocated or available to a UE, an amount of bandwidth available for an NR band may be reduced when the network selects a band combination for the UE that increases an amount of bandwidth available for the LTE band. In some other examples, an amount of bandwidth available for an LTE band may be reduced when the network selects a band combination for the UE that includes a higher frequency NR bandwidth. In such examples, the selected band combination may support only low LTE bands, for example, associated with a reduced number of LTE MIMO layers. In some such examples, after the network configures the UE to use the band combination associated with the highest NR band, the UE may move to an area with reduced NR coverage, such as a cell edge. In such examples, the UE may be forced to communicate on only the supported LTE band because NR coverage may be insufficient, which may result in reduced communication throughput. In some such examples, reconfiguring the UE to use a band combination associated with an increased LTE band size may increase throughput. Still, in some examples, the network may fail to reconfigure the UE to use a different band combination.

Aspects of the present disclosure generally relate to reconfiguring an EN-DC band combination for a UE based on an updated UE radio capability. Various aspects more specifically relate to techniques and processes for signaling an updated UE radio capability to force a network node to reconfigure an active EN-DC band combination at the UE. In particular examples, the UE may, prior to the reconfiguration, transmit to the network node an indication of a current UE radio capability indicating multiple EN-DC band combinations supported by the UE. As described above, each EN-DC band combination may be associated with a supported band for a first RAT, such as LTE, and a supported band for a second RAT, such as NR. In such examples, the UE may receive, from the network node, an indication of an EN-DC band combination corresponding to one of the multiple EN-DC band combinations supported by the current UE radio capability. The indication may be an EN-DC band configuration that configures the UE to use a particular EN-DC band combination from the multiple EN-DC band combinations supported by the current UE radio capability. The EN-DC band combination corresponding to the EN-DC band configuration may be referred to as an active EN-DC band combination. In some examples, the UE may measure a metric based on communications performed using the active EN-DC band combination. In some such examples, the metric may be associated with the active EN-DC band combination and measured at different instances of time to account for different channel conditions observed by the UE. In some implementations, the UE may determine that a metric satisfies a failure condition, such as the metric being less than a metric threshold for a period of time. In some examples, one metric may be a data throughput value. In some such examples, one or more data throughput values obtained at different time instances over the period of time may be low enough to satisfy the failure condition after a change in network conditions, such as the UE moving to a cell edge.

In various aspects, based on satisfaction of the failure condition for the current active EN-DC band combination, the UE identifies one or more different EN-DC band combinations, of the multiple EN-DC band combinations supported by the UE (as indicated by the previously indicated UE capability), that satisfy a metric condition. In some examples, the metric condition may be satisfied based on a data throughput value, such as a potential or estimated data throughput value, associated with the identified EN-DC band combination being greater than an actual data throughput value associated with the active EN-DC band combination. In some examples, the UE determines a respective potential data throughput value associated with each non-active EN-DC band combination of the multiple EN-DC band combinations supported by the previously indicated UE radio capability. In such examples, the UE may identify one or more non-active EN-DC band combinations, from a group of non-active EN-DC band combinations, that satisfy the metric condition. Additionally, in such examples, the UE may indicate an updated UE radio capability indicating support for the one or more non-active EN-DC band combinations that satisfy the metric condition. In some other examples, the UE may transmit, to a network server, data throughput values associated with the active EN-DC band combination. The network server may also receive data throughput values associated with other active EN-DC band combinations of one or more other UEs. The active EN-DC band combination of the UE may be a different EN-DC band combination than the other active EN-DC band combinations of one or more other UEs. In such other examples, each UE may collect data throughput values based on communications performed using a respective active EN-DC band combination. The network server may then identify one or more EN-DC band combinations associated with a data throughput value that is higher than the data throughput value associated with the active EN-DC band combination of the UE. Additionally, in such other examples, the network server may transmit to the UE an indication of the one or more EN-DC band combinations associated with the data throughput value that is higher than the data throughput value associated with the active EN-DC band combination of the UE. The UE may then transmit, to the network node, an indication of an updated UE radio capability that supports the one or EN-DC combinations indicated by the network node.

Particular aspects of the subject matter described in this disclosure can be implemented to realize one or more of the following potential advantages. In some aspects, the described techniques can be used by a UE to dynamically reconfigure an active EN-DC combination configured at the UE to account for a change in network coverage. In some such aspects, the UE may update a UE radio capability and indicate the updated UE radio capability to obtain a reconfiguration of the active EN-DC combination configured at the UE, which may improve communications between the UE and a base station, among other advantages. As an example, the change in the active EN-DC combination configured at the UE may result in increased data throughput in areas with reduced NR coverage, such as a cell edge.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with UEs and may also be referred to as a base station, a NR BS, a Node B, a gNB, a 5G node B (NB), an access point, a transmit and receive point (TRP), or the like. Each BS may provide communications coverage for a particular geographic area. In 3GPP, the term "cell" can refer to a coverage area of a BS or a BS subsystem serving this coverage area, depending on the context in which the term is used.

A BS may provide communications coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, or the like.

The wireless network 100 may be a heterogeneous network that includes BSs of different types, for example, macro BSs, pico BSs, femto BSs, relay BSs, or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs may also communicate with one another, for example, directly or indirectly via a wireless or wireline backhaul.

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a customer premises equipment (CPE). UE 120 may be included inside a housing that houses components of UE 120, such as processor components, memory components, or the like.

In general, any number of wireless networks may be deployed in a given geographic area. Each wireless network may support a particular radio access technology (RAT) and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere as being performed by the base station 110.

As shown in FIG. 1, a UE 120 may include an EN-DC band module 138. The EN-DC band module 138 may transmit, to a base station 110, an indication of a first UE radio capability identifying multiple EN-DC band combinations supported by the UE. The EN-DC band module 138 may also receive, from the base station 110, an indication of an active EN-DC band combination of the multiple EN-DC band combinations based on transmitting the indication of the first UE radio capability. The EN-DC band module 138 may further indicated a metric associated with channel conditions of the active EN-DC band combination. In some implementations, the EN-DC band module 138 may transmit, to the base station 110, based on the metric satisfying a failure condition, an indication of a second UE radio capability. In some examples, the second UE radio capability indicates support for one or more non-active EN-DC combinations, of the multiple EN-DC band combinations, associated with higher metrics than the metric associated with the active EN-DC band combination. In some other implementations, the EN-DC band module 138 transmits the metric to a network device that is different from the base station 110 and receives, from the network device, an indication of the subset of one or more EN-DC combinations, of the multiple EN-DC band combinations, associated with higher metrics than the multiple metrics based on transmitting the multiple metrics. In such implementations, the network device may transmit a message that indicates the EN-DC band combination associated with a highest data throughput. In some examples, the EN-DC band module 138 may further transmit, to the base station 110, an indication of the updated UE radio capability.

Additionally, a base station 110 may include an EN-DC band module 140. The EN-DC band module 140 may receive a first UE radio capability identifying multiple EN-DC band combination supported by a UE 120. The EN-DC band module 140 may select one of the EN-DC band combinations based on a current network coverage of the UE 120. Additionally, the EN-DC band module 140 may transmit an indication of an EN-DC band combination selected by the EN-DC band module 140.

Figure 2:
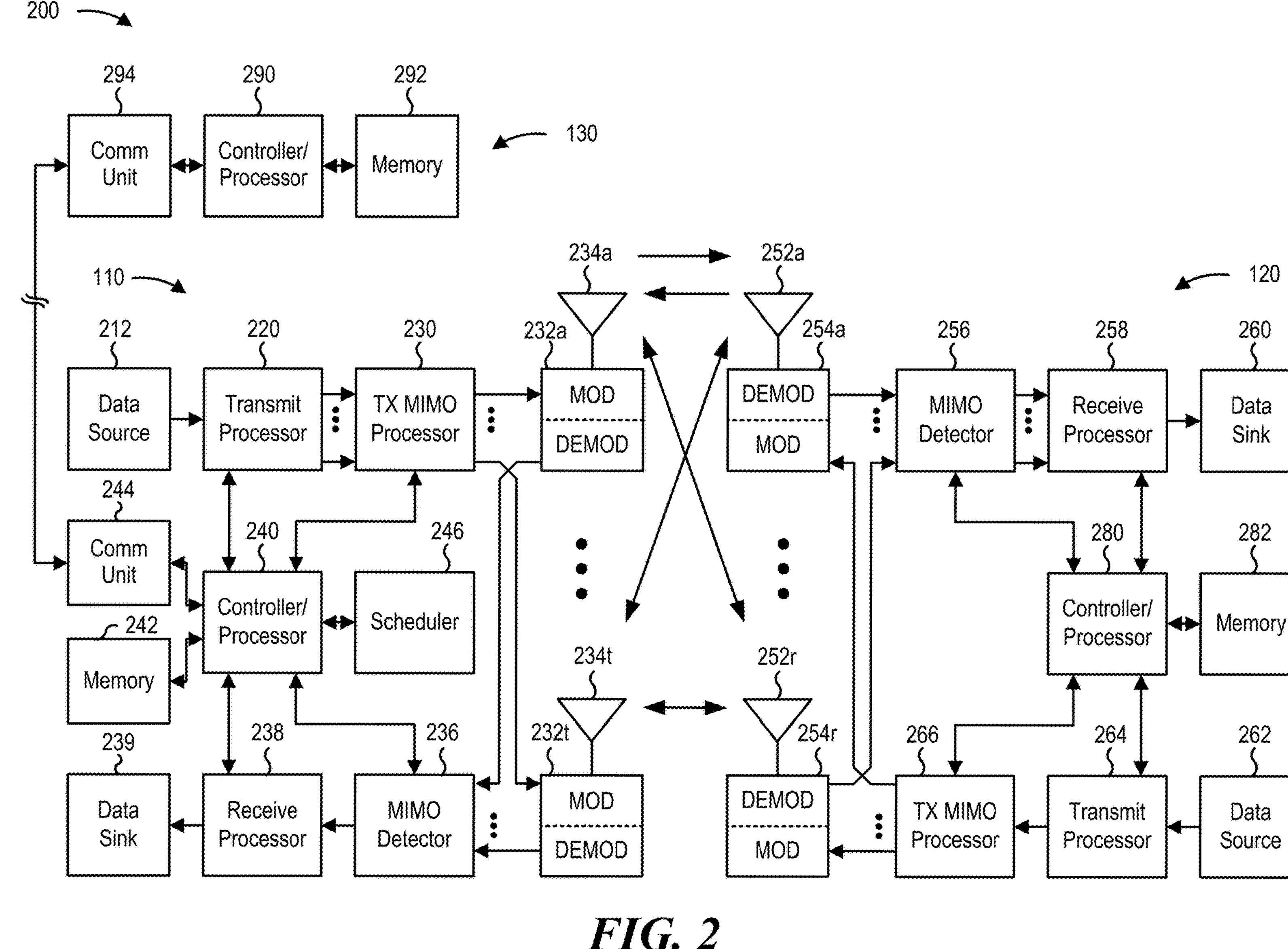
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 may also process system information (for example, for semi-static resource partitioning information (SRPI) or the like) and control information (for example, CQI requests, grants, upper layer signaling, or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), or the like. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (for example, for DFT-s-OFDM, CP-OFDM, or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, or any other component(s) of FIG. 2 may perform one or more techniques associated with dynamic slot aggregation configurations, as described in more detail elsewhere. For example, the controller/processor 240 of the base station 110, the controller/processor 280 of the UE 120, or any other component(s) of FIG. 2 may perform or direct operations of, for example, the processes of FIGS. 8-9 and 11 or other processes as described. Memories 242 and 282 may store data and program codes for the base station 110 and UE 120, respectively. A scheduler 246 may schedule UEs for data transmission on the downlink or uplink.

Figure 3:
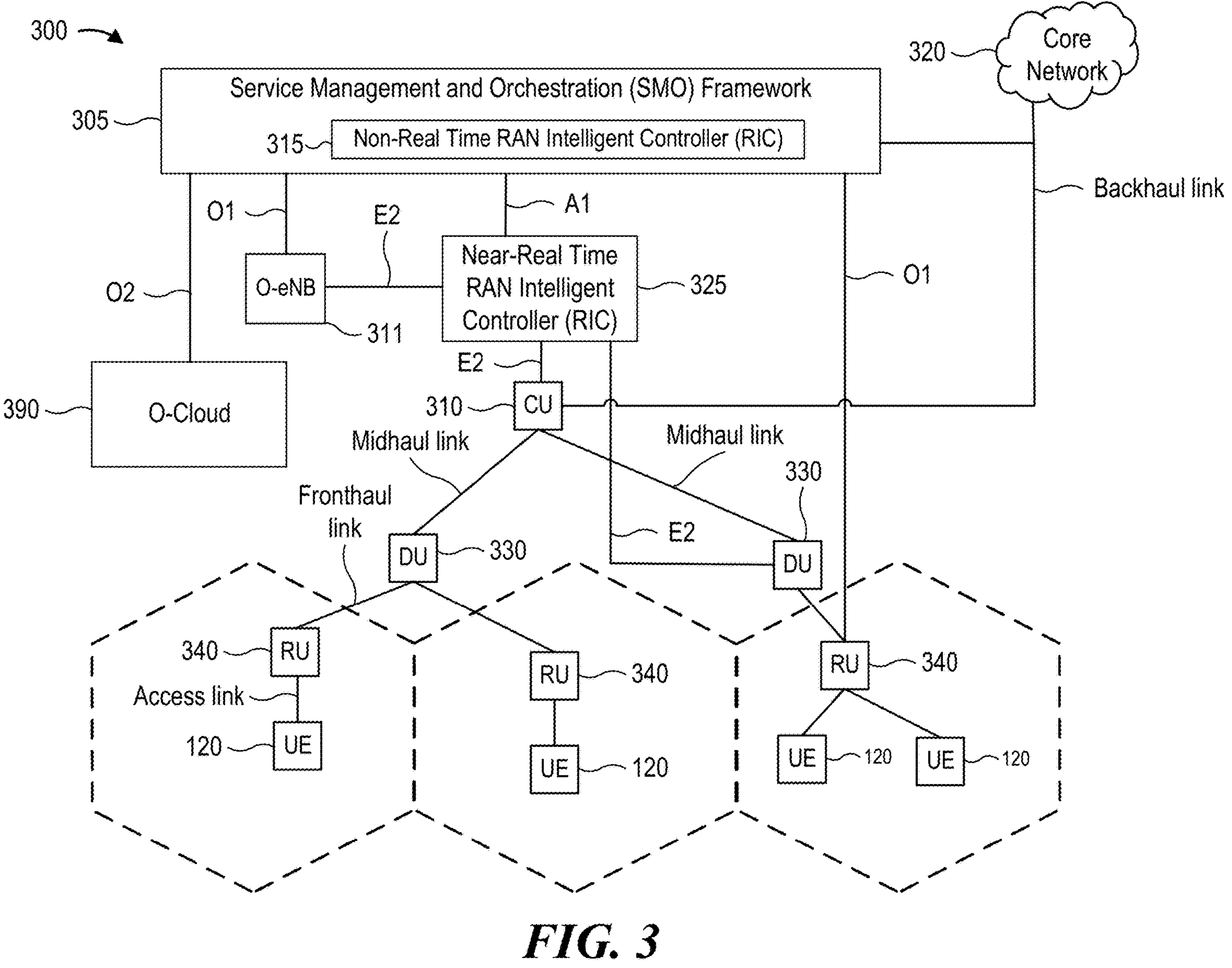
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via 01) or via creation of RAN management policies (such as A1 policies).

As described above, wireless networks may support multiple RATs to improve connectivity. In some examples, a wireless network may support EN-DC. In such examples, the wireless network may support both an E-UTRA RAT (for example, an LTE RAT) and a 5G NR RAT. Additionally, the wireless network may support multiple frequency bands for each respective RAT. In some examples, the network may configure the UE to communicate in specific band combination from multiple band combinations supported by the UE. In some examples, due to bandwidth limitations, a UE may support a larger LTE bandwidth by decreasing a size of a supported NR bandwidth. In some other examples, the UE may support a larger NR bandwidth by decreasing a size of a supported LTE bandwidth.

In some wireless communication systems, a UE may advertise a UE radio capability that identifies different EN-DC band combinations supported by the UE. Some EN-DC band combinations may include an LTE band, an NR FDD band, and an NR TDD band. Other EN-DC band combinations may include an LTE band and an NR FDD band, or an LTE band and an NR TDD band (for example, a millimeter wave band). In some implementations, the UE may group EN-DC band combinations based on a group definition. In some examples, each group may be referred to as an envelope. Each EN-DC band combination in an envelope may conform to the group definition. Table 1 provides an example of different groups and the corresponding group definitions, in accordance with aspects of the present disclosure.

TABLE 1

| Group Number | Group Name | Total LTE Layers | NR FDD Total Bandwidth | NR TDD Total Bandwidth |
|---|---|---|---|---|
| 1 | FDD and TDD NSA | 10 layers | 50 MHz | 100 MHz |
| 2 | FDD NSA | 20 layers | 50 MHz | 0 |
| 3 | FDD SA | 0 | 60 MHz | 0 |
| 4 | TDD NSA | 16 layers | 0 | 60 MHz |

For ease of explanation, each group of Table 1 is associated with a group name that identifying the type of EN-DC band combinations of the group. For example, a first group (group 1) corresponds to FDD and TDD non-standalone (NSA) band combinations. In such an example, the EN-DC band combinations associated with the first group include an LTE band, an NR FDD band, and an NR TDD band. As another example, a second group (group 2) corresponds to FDD NSA band combinations. In such an example, the EN-DC band combinations associated with the second group include an LTE band and an NR FDD band. In yet another example, a third group (group 3) corresponds to FDD standalone (SA) band combinations. In such an example, the EN-DC band combinations associated with the third group only include an NR FDD band. In another example, a fourth group (group 4) corresponds to TDD NSA band combinations. In such an example, the EN-DC band combinations associated with the fourth group include an LTE band and an NR TDD band.

Additionally, Table 1 indicates a total number of LTE layers (for example, LTE MIMO layers), a total NR FDD bandwidth, and a total NR TDD bandwidth that may be supported by corresponding bands of each EN-DC band combination associated with a group. Specifically, in the example of Table 1, the total LTE downlink layers column indicates a maximum number of LTE layers (for example, LTE MIMO layers) that may be supported by each LTE band of an EN-DC band combination associated with the group number. As an example, a number of layers supported by an LTE band of each EN-DC band combination associated with the first group may be equal to or less than ten. In some examples, each LTE band may support one or more component carriers. Thus, in some such examples, the total LTE downlink layers column indicates a maximum number of LTE layers that may be supported by the one or more component carriers of each LTE band of an EN-DC band combination associated with the group number. As an example, one LTE band of an EN-DC band combination associated with the first group may include three component carriers, where a first component carrier is associated with four layers, a second component carriers is associated with four layers, and a third component carriers is associated with two layers. As another example, another LTE band of an EN-DC band combination associated with the first group may include one component carriers associated with four MIMO layers. Additionally, in the example of Table 1, the NR FDD total bandwidth indicates a total bandwidth amount that may be supported by an NR FDD band of an EN-DC band combination associated with a corresponding group. As an example, an NR FDD band of an EN-DC band combination associated with group one may support a bandwidth equal to or less than 50 MHz. Furthermore, in the example of Table 1, the NR TDD total bandwidth indicates a total bandwidth amount that may be supported by an NR TDD band of an EN-DC band combination associated with a corresponding group. As an example, an NR TDD band of an EN-DC band combination associated with group one may support a bandwidth equal to or less than 100 MHz. Each NR TDD band and NR FDD band may support one or more component carriers.

According to aspects of the present disclosure, a network may configure a UE with an EN-DC band combination based on multiple EN-DC band combinations identified in the UE radio capability advertised the UE. In some implementations, the network may select, from the multiple EN-DC band combinations, an EN-DC band combination associated with a highest NR bandwidth based on the UE's NR coverage satisfying an NR coverage condition. In some examples, the coverage condition may be satisfied based on the UE's NR coverage being greater than or equal to an NR coverage threshold. As described, due to a limited amount of available bandwidth, the EN-DC band combination associated with the highest NR bandwidth may be support a lower LTE bandwidth. In some examples, the UE may move from a location that satisfies the NR coverage condition to a location that fails to satisfy the NR coverage condition. In some examples, the UE may fail to satisfy the NR coverage condition based on a location of the UE being equal to or less than a distance from a cell edge. In such implementations, the UE may advertise (for example, re-advertise) an updated UE radio capability based on a metric, such as a data throughput value, satisfying a failure condition. In some such implementations, the network may reconfigure the UE to use an EN-DC band combination identified in the updated UE radio capability. The EN-DC band combination identified in the updated UE radio capability may be associated with a metric that is higher than a metric of an active EN-DC band combination. In some examples, the EN-DC band combination identified in the updated UE radio capability may support an increased LTE band size (for example, increase LTE bandwidth).

Figure 4A:
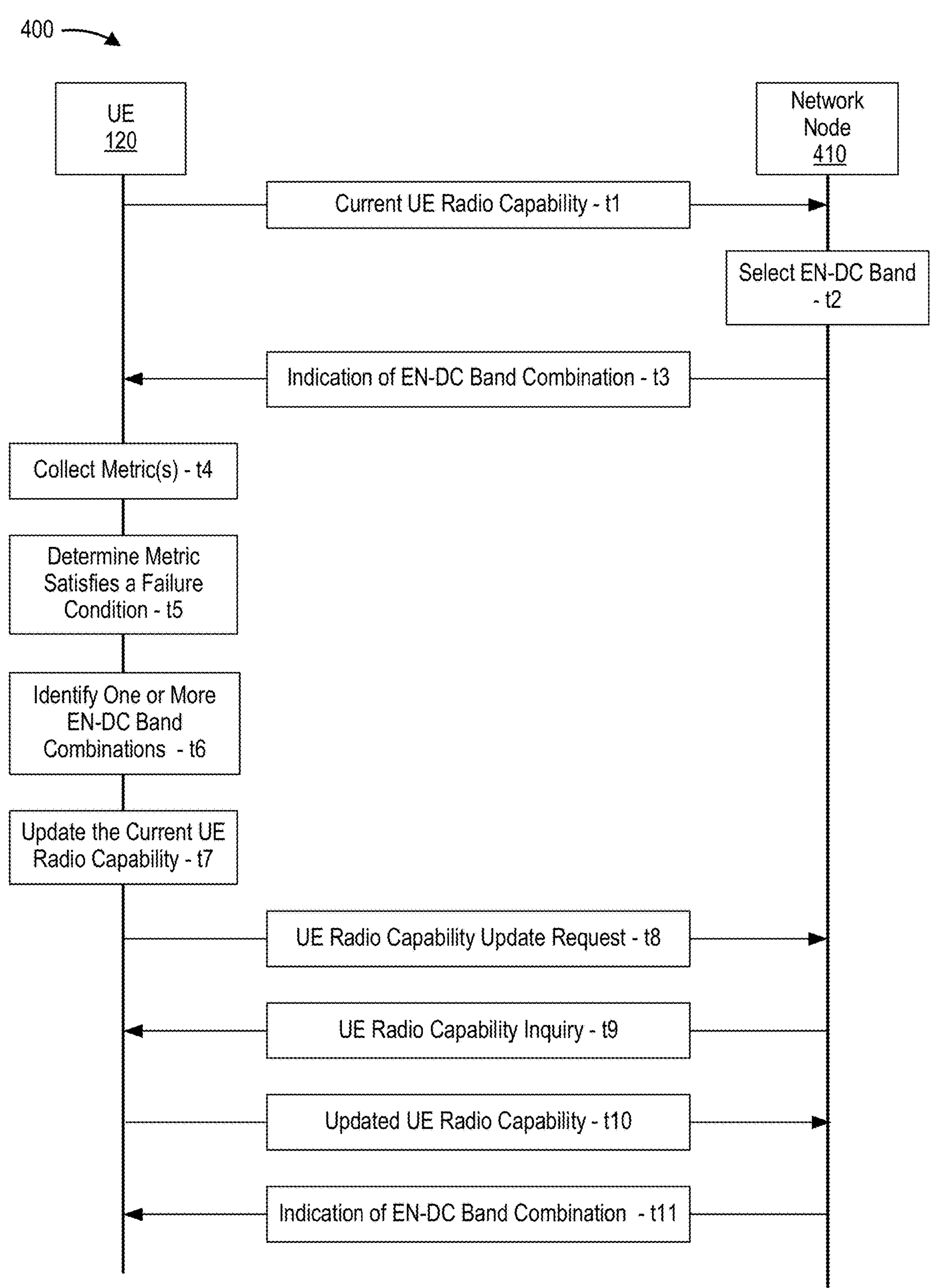
FIG. 4A is a timing diagram illustrating an example of an evolved universal terrestrial radio access network (E-UTRAN) new radio (NR) dual connectivity (EN-DC) band combination configuration procedure, in accordance with aspects of the present disclosure.

FIG. 4A is a timing diagram illustrating an example 400 for updating a UE radio capability, in accordance with aspects of the present disclosure. As shown in the example 400 of FIG. 4A, a UE 120 may communicate with a network node 410. The network node 410 may be an example of a base station 110, as described with reference to FIGS. 1 and 2, or a CU 310, a DU 330, or an RU 340 as described with reference to FIG. 3. As shown in FIG. 4A, at time t1, the UE 120 transmits a current UE radio capability to the network node 410. The current UE radio capability may indicate different EN-DC band combinations supported by the UE 120.

As shown in FIG. 4A, at time t2, the network node 410 selects an EN-DC band combination from the different EN-DC band combinations indicated by the current UE radio capability. In some implementations, the network node 410 selects the EN-DC band combination associated with a highest NR bandwidth supported by the UE 120 based on the current UE radio capability. At time t3, the UE 120 receives a message indicating an EN-DC band combination from the multiple EN-DC band combinations supported by the UE 120 in the current UE radio capability. The indication may be an EN-DC band configuration that configures the EN-DC band combination at the UE 120. The UE 120 may communicate on the bands (for example, LTE band and NR band) associated with the EN-DC band combination configured by the network node 410. The EN-DC band combination configured based on the EN-DC band configuration may be an example of an active EN-DC band combination.

In some implementations, at time t4, the UE 120 collects a metric at different time instances, where each time instance may be associated with a channel condition of the active EN-DC band combination. The metric may be a particular type of metric, such as a data throughput value, or a combination of different metrics. In some examples, the UE 120 collects the metric at different time instances over a period of time and at different locations within a cell, such as near the network node 410 or at the cell edge. Based on the metric, the UE 120 may determine the network node 410 fails to satisfy an EN-DC band reconfiguration condition. Alternatively, in some examples, at time t5, the UE 120 may determine the metric satisfies a failure condition. In such examples, the metric (e.g., the data throughput value) satisfies the failure condition based on the metric being less than a metric threshold, such as a throughput threshold value, for a period of time. As an example, the data throughput value may be less than the data threshold when the UE 120 is at a cell edge. In this example, the network node 410 may fail to reconfigure the EN-DC band combination when the UE 120 is at the cell edge, thereby causing the one or more data throughput values to be less than the throughput threshold value. In some examples, the metrics may be multiple different metrics.

In some implementations, based on the metric satisfying the failure condition, the UE 120 may identify one or more EN-DC band combinations associated with a higher metric than a metric of the active EN-DC band combination (time t6). In some examples, the UE 120 may identify the EN-DC band combination associated with the highest metric. In some implementations, the UE 120 identifies the EN-DC band combination associated with the highest data throughput value from one or more potential data throughput values and also the data throughput values collected at time t4. In such implementations, each potential data throughput value is associated with a different potential EN-DC band combination of the EN-DC band combinations supported by the current UE radio capability. Each potential EN-DC band combination may be different from the active EN-DC band combination. The potential data throughput values may be estimated based on previous throughput data. Additionally, or alternatively, the EN-DC band combination associated with a highest data throughput may be a highest possible data throughput value for the active EN-DC band combination based on a channel condition satisfying a channel quality condition. As an example, the channel condition may satisfy the channel quality condition based on a signal strength being greater than or equal to a signal strength threshold. In some examples, the network node 410 may not support the EN-DC band combination associated with the highest data throughput. As an example, the EN-DC band combination including the 5900 MHz NR TDD band may be associated with the highest data throughput. However, the network node 410 may not support the 5900 MHz NR band due to a limited active bandwidth, for example.

In some implementations, the EN-DC band combination associated with the highest metric (for example, highest data throughput value) may be different from the active EN-DC band combination. In the example 400 of FIG. 4A, at time t7, the UE 120 may update the current UE radio capability to an updated UE radio capability that is limited to identifying the EN-DC band combination associated with a highest metric, such as a highest data throughput metric. In some other examples, the updated UE radio capability that indicates support for a subset of EN-DC band combinations of the multiple EN-DC band combinations supported by the previous UE radio capability. In some such examples, the subset of EN-DC band combinations may be in a same group as the EN-DC band combination associated with the highest metric. As an example, the EN-DC band combination associated with the highest metric may correspond to the first group of Table 1. In such an example, the updated UE radio capability may indicate support for only the EN-DC band combinations in the first group.

At time t8, the UE 120 transmits, to the network node 410, a request for a UE radio capability update based on identifying the EN-DC band combination associated with the highest metric. In some other examples, the request may be transmitted based on updating the UE radio capability. At time t9, the network node 410 transmits a UE radio capability inquiry based on the request transmitted by the UE 120 at time t8. At time t10, the UE 120 transmits, to the network node 410, the updated UE radio capability. At time t11, the network node 410 transmits an indication of an EN-DC band combination based on the updated UE radio capability transmitted by the UE 120 at time t10. The indication may configure the UE 120 to communicate on the EN-DC band combination associated with the highest metric (e.g., data throughput metric) or a metric higher than the metric of a previous EN-DC band combination. In some examples, the UE 120 is configured to communicate on the EN-DC band combinations that satisfies a data throughput condition. In such examples, the data throughput condition may be satisfied based on the data throughput metric being greater than the one or more data throughput metrics associates with the active EN-DC band combination.

Figure 4B:
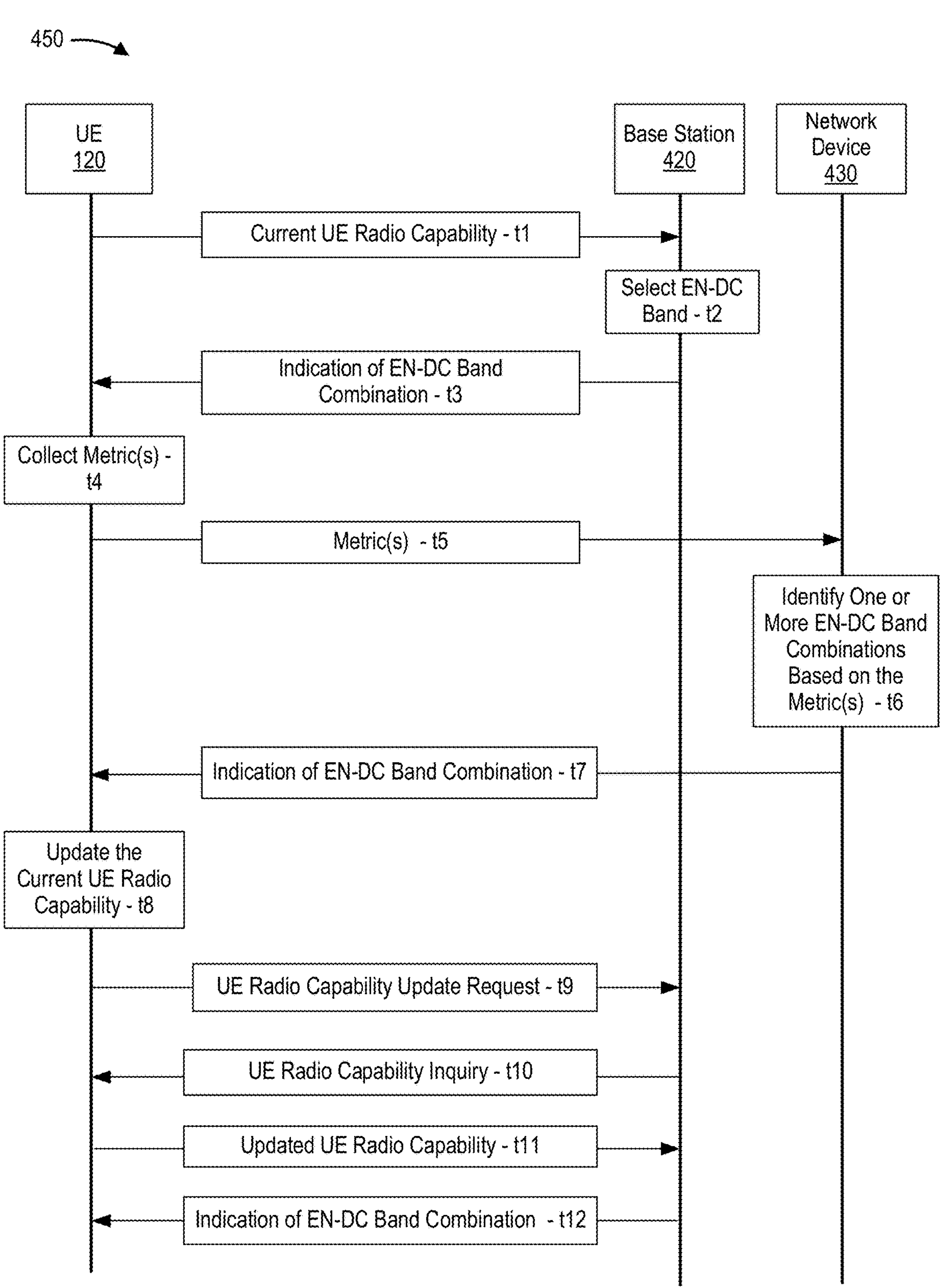
FIG. 4B is a timing diagram illustrating an example of an EN-DC band combination reconfiguration procedure, in accordance with aspects of the present disclosure.

FIG. 4B is a timing diagram illustrating an example 450 for updating a UE radio capability, in accordance with aspects of the present disclosure. As shown in the example 450 of FIG. 4B, a UE 120 may communicate with a base station 420. The base station 420 may be an example of a base station 110, as described with reference to FIGS. 1 and 2, or a CU 310, a DU 330, or an RU 340 as described with reference to FIG. 3. A network device 430 may be an example of a cloud server or another type of network server device.

As shown in FIG. 4B, at time t1, the UE 120 transmits a current UE radio capability to the base station 420. The current UE radio capability may indicate different EN-DC band combinations supported by the UE 120. As shown in FIG. 4B, at time t2, the base station 420 selects an EN-DC band combination from the different EN-DC band combinations indicated by the current UE radio capability. In some implementations, the base station 420 selects the EN-DC band combination associated with a highest NR bandwidth supported by the UE 120. At time t3, the UE 120 receives a message indicating an EN-DC band combination from the multiple EN-DC band combinations supported by the UE 120 in the current UE radio capability. The UE 120 may communicate on the bands (for example, LTE band and NR band) associated with the EN-DC band combination configured based on the indication received from the base station 420. The EN-DC band combination configured based on the indication received from the base station 420 may be an example of an active EN-DC band combination.

In some implementations, at time t4, the UE 120 collects a metric based on the active EN-DC band combination. As described, the metric may be a particular metric, such as a data throughput value. In such implementations, the metric may be associated with a channel condition of the active EN-DC band combination. In some examples, the UE 120 measures the metric at different time instances over a period of time and at different locations within a cell, such as near the base station 420 or at the cell edge. In the example of FIG. 4B, at time t5, the UE 120 transmits the metric to the network device 430. Although not shown in FIG. 4B, the network device 430 may also receive and store other metrics from one or more other UEs. The network device 430 may analyze the metrics from the UE 120 and the one or more other UEs to identify an EN-DC band combination associated with a highest metrics (time t6). Additionally, or alternatively, the network device 430 may identify one or more EN-DC band combinations associated with a higher metric than the metric of the active EN-DC band combination of the UE 120. In some examples, each one or more EN-DC band combinations is associated with a data throughput metric that satisfies a data throughput condition. In such examples, the data throughput condition may be satisfied based on the data throughput metric being greater than the one or more data throughput metrics associates with the active EN-DC band combination. In some examples, the UE 120 may measure one or more different metrics at different time instances over the period of time.

At time t7, the network device 430 transmits an indication of the EN-DC band combination associated with the highest metric, such as a highest data throughput metric. At time t8, the UE 120 updates the current UE radio capability to an updated UE radio capability that is limited to indicating support for a subset of the multiple EN-DC band combinations supported by the UE 120. The subset may be one or more EN-DC band combinations in a same group as the EN-DC band combination associated with the highest data throughput. Alternatively, the subset may be one or more EN-DC band combinations with a higher metric than the metric of the active EN-DC band combination. In some other examples, the updated UE radio capability may indicate support for only the EN-DC band combination associated with the highest metric. In the example of FIG. 4B, the operations of the wireless communication system at times t9, t10, t11, and t12 are the same as the operations of the wireless communication system at times t8, t9, t10, and t**1*l*, respectively, as described with respect to FIG. 4A. For brevity, a description of the operations at times t9, t10, t11, and t12 of FIG. 4**B is omitted.

Figure 5:
FIG. 5 is a block diagram of a wireless communication device that supports dynamically updating supported band combinations based on metric observations and network behavior, in accordance with various aspects of the present disclosure.
Figure 5:
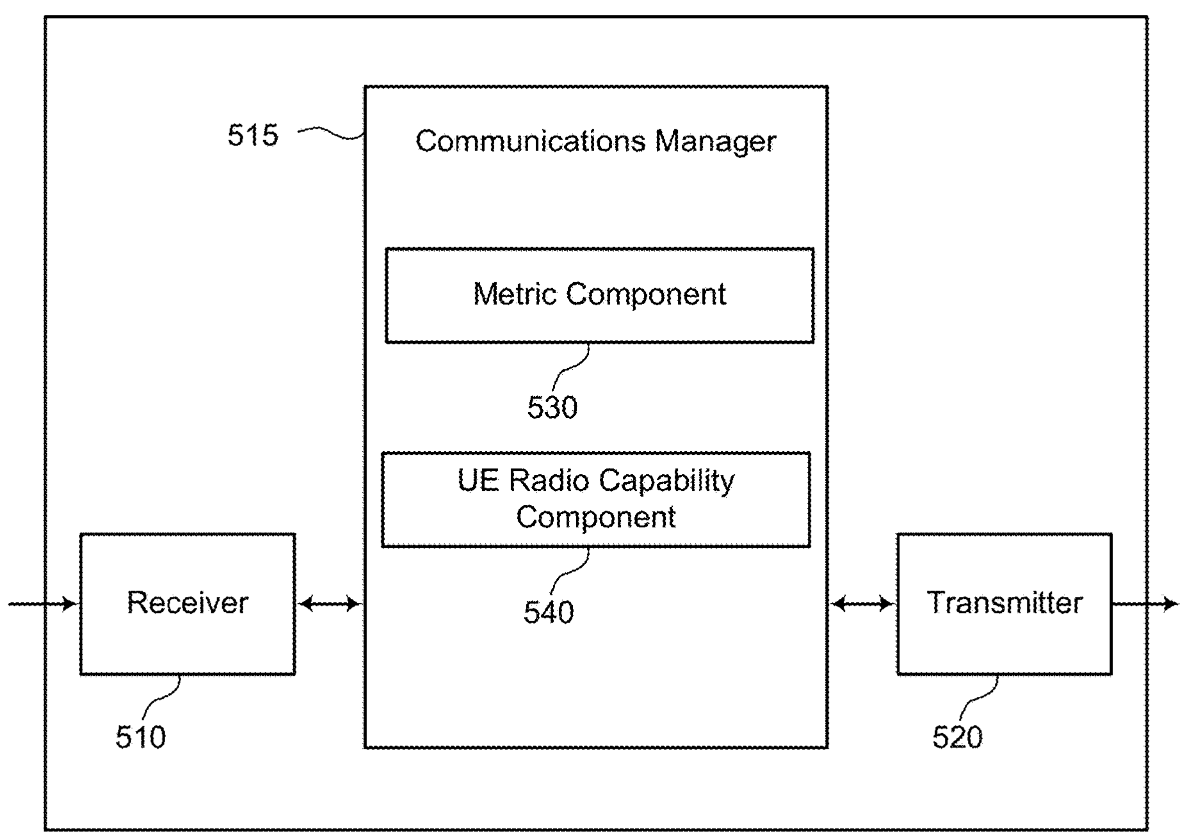

FIG. 5 is a block diagram of a wireless communication device 500 that supports dynamically updating supported band combinations based on metric observations and network behavior, in accordance with various aspects of the present disclosure. The wireless communication device 500 may be an example of aspects of a UE 120, or its components, as described with reference to FIGS. 1, 2, 3, 4A, and 4B. The wireless communication device 500 may include a receiver 510, a communications manager 515, and a transmitter 520, which may be in communication with one another (for example, via one or more buses). In some examples, the wireless communication device 500 is configured to perform operations including operations of the process 600 and 700 described below with reference to FIGS. 6 and 7, respectively.

In some examples, the wireless communication device 500 can include a chip, system-on-a-chip (SoC), chipset, package, or device that includes at least one processor and at least one modem (for example, a 5G modem or other cellular modem). In some examples, the communications manager 515, or its sub-components, may be separate and distinct components. In some examples, at least some components of the communications manager 515 are implemented at least in part as software stored in a memory. For example, portions of one or more of the components of the communications manager 515 can be implemented as non-transitory code executable by the processor to perform the functions or operations of the respective component.

The receiver 510 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110, DU 330, RU 340, CU 310, network node 410, base station 420, or network device 430, or their components, as described with reference to FIGS. 1, 2, 3, 4A, and 4B, respectively.

The received information may be passed on to other components of the device 500. The receiver 510 may be an example of aspects of the receive processor 238 described with reference to FIG. 2. The receiver 510 may include a set of radio frequency (RF) chains that are coupled with or otherwise utilize a set of antennas (for example, the set of antennas may be an example of aspects of the antennas 234*a* through 234*t* described with reference to FIG. 2).

The transmitter 520 may transmit signals generated by the communications manager 515 or other components of the wireless communication device 500. The transmitter 520 may be an example of aspects of the transmit processor 220 described with reference to FIG. 2. The transmitter 520 may be coupled with or otherwise utilize a set of antennas (for example, the set of antennas may be an example of aspects of the antennas 234*a* through 234*t* described with reference to FIG. 2), which may be antenna elements shared with the receiver 510. In some examples, the transmitter 520 is configured to transmit random access procedure messages in a physical random access channel (PRACH) or physical uplink shared channel (PUSCH).

The communications manager 515 may be an example of aspects of the controller/processor 280 described with reference to FIG. 2. The communications manager 515 includes a metric component 530. Working in conjunction with the receiver 510 or the transmitter 520, the metric component 530 may obtain a metric, such as data throughput values, or one or more other metrics, associated with channel conditions of a first EN-DC band combination. The metric may be an uplink metric or a downlink metric. In some examples, working in conjunction with the transmitter 520, the metric component 530 may transmit the metric to a network device. In such examples, working in conjunction with the receiver 510, the metric component 530 may receive, from the network device, an indication of an EN-DC band combination associated with a highest metric or an indication of one or more non-active EN-DC combinations, of multiple EN-DC band combinations supported by a previously indicated UE radio capability, associated with higher metric than the metric associated with the active EN-DC band combination.

The communications manager 515 may also include a UE radio capability component 540. Working in conjunction with the transmitter 520, the UE radio capability component 540 may transmit an indication of the first UE radio capability identifying multiple EN-DC band combinations supported by the wireless communication device 500. Additionally, working in conjunction with the receiver 510, the UE radio capability component 540 may receive an indication of a first EN-DC band combination of the multiple EN-DC band combinations based on transmitting the indication of the first UE radio capability. Furthermore, the UE radio capability component 540 may update a previously indicated UE radio capability to another UE radio capability that supports one or more non-active EN-DC combinations, of the multiple EN-DC band combinations, associated with the higher metric. In some examples, the metric component 530 may provide the one or more non-active EN-DC combinations to the UE radio capability component 540. Additionally, working in conjunction with the transmitter 520, the UE radio capability component 540 may transmit an indication of the updated UE radio capability.

Figure 6:
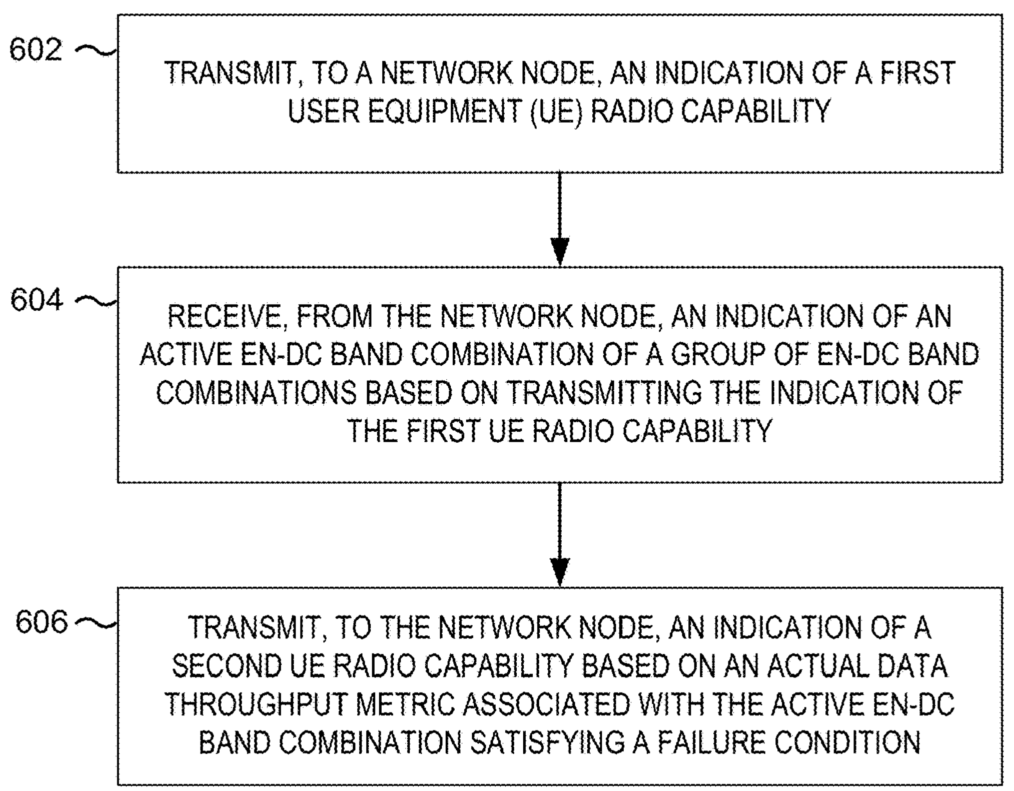
FIGS. 6 and 7 are flow diagrams illustrating examples of a process performed at a UE for dynamically updating supported band combinations based on metric observations and network behavior, in accordance with various aspects of the present disclosure.

FIG. 6 is a flow diagram illustrating an example process 600 performed, for example, by a UE, in accordance with various aspects of the present disclosure. The example process 600 is an example of dynamically updating supported band combinations based on metric observations and network behavior. In some implementations, the process 600 may be performed by a wireless communication device operating as or within a UE, such as one of the UEs 120, or its components, as described with reference to FIGS. 1, 2, 3, 4A, and 4B. The process 600 may be applied to uplink communications from the UE or downlink communications received at the UE.

As shown in FIG. 6, the process 600 begins at block 602 by transmitting, to a network node, an indication of a first UE radio capability. The first UE radio capability may indicate support for a group of EN-DC band combinations. At block 604, the process 600 receives, from the network node, an indication of an active EN-DC band combination of the group of EN-DC band combinations based on transmitting the indication of the first UE radio capability. At block 606, the process 600 transmits, to the network node, an indication of a second UE radio capability based on an actual data throughput metric associated with the active EN-DC band combination satisfying a failure condition. The second UE radio capability may indicate support for one or more non-active EN-DC combinations of the group of EN-DC band combinations. Each one of the one or more non-active EN-DC combinations may be associated with a respective potential data throughput metric, of a group of potential data throughput metrics, that is greater than a data throughput threshold value.

Figure 7:
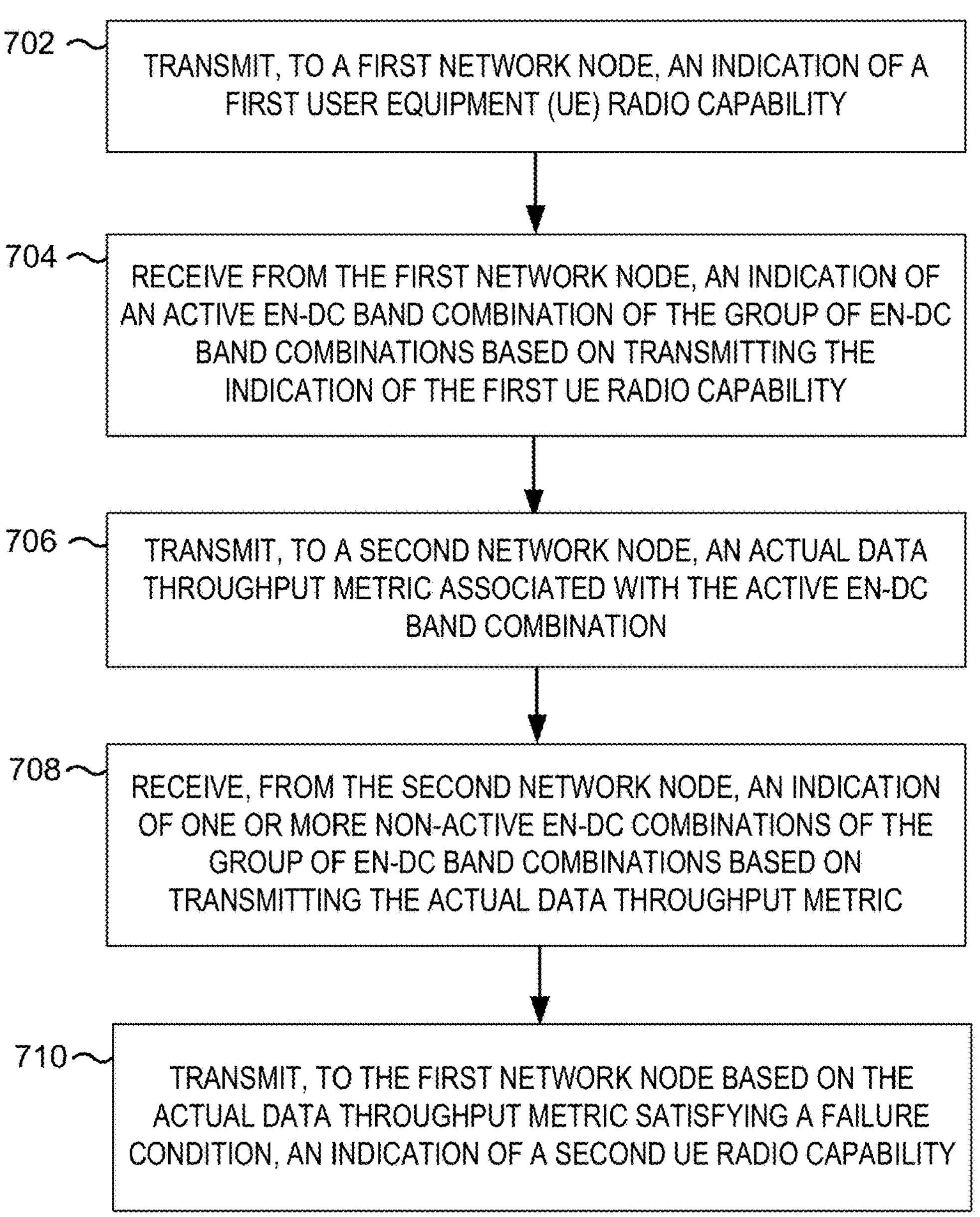

FIG. 7 is a flow diagram illustrating an example process 700 performed, for example, by a UE, in accordance with various aspects of the present disclosure. The example process 700 is an example of dynamically updating supported band combinations based on metric observations and network behavior. In some implementations, the process 700 may be performed by a wireless communication device operating as or within a UE, such as one of the UEs 120, or its components, as described with reference to FIGS. 1, 2, 3, 4A, and 4B.

As shown in FIG. 7, at block 702, the process 700 begins by transmitting, to a first network node, an indication of a first UE radio capability. The first UE radio capability may indicate support for a group of EN-DC band combinations. At block 704, the process 700 receives, from the first network node, an indication of an active EN-DC band combination of the group of EN-DC band combinations based on transmitting the indication of the first UE radio capability. At block 706, the process 700 transmits, to a second network node, an actual data throughput metric associated with the active EN-DC band combination. At block 708, the process 700 receives, from the second network node, an indication of one or more non-active EN-DC combinations of the group of EN-DC band combinations based on transmitting the actual data throughput metric. Each one of the one or more non-active EN-DC combinations may be associated with a respective potential data throughput metric, of a group of potential data throughput metrics, that is greater than a data throughput threshold value. At block 710, the process 700 transmits, to the first network node based on the actual data throughput metric satisfying a failure condition, an indication of a second UE radio capability. The second UE radio capability may indicate support for the one or more non-active EN-DC combinations.

The following provides an overview of some Aspects of the present disclosure:

Aspect 1. A method of wireless communication performed at a UE, comprising: transmitting, to a network node, an indication of a first UE radio capability, the first UE radio capability indicating support for a plurality of EN-DC band combinations; receiving, from the network node, an indication of an active EN-DC band combination of the plurality of EN-DC band combinations based on transmitting the indication of the first UE radio capability; and transmitting, to the network node, an indication of a second UE radio capability based on an actual data throughput metric associated with the active EN-DC band combination satisfying a failure condition, the second UE radio capability indicating support for one or more non-active EN-DC combinations of the plurality of EN-DC band combinations, each one of the one or more non-active EN-DC combinations being associated with a respective potential data throughput metric, of a plurality of potential data throughput metrics, that is greater than a data throughput threshold value.

Aspect 2. The method of Aspect 1, wherein: each EN-DC band combination of the plurality of EN-DC band combinations comprises a first RAT band and a second RAT band; and the second RAT band comprises one or both of a FDD band or a time TDD band Aspect 3. The method of Aspect 2, wherein the first RAT band is a LTE band and the second RAT band is a NR sub-6 GHz band or an NR millimeter wave band.

Aspect 4. The method of any one of Aspects 1, further comprising identifying the one or more non-active EN-DC combinations based on the plurality of potential data throughput metrics and the actual data throughput metric.

Aspect 5. The method of Aspect 4, further comprising: transmitting, to the network node, a request for a UE radio capability update based on identifying the one or more non-active EN-DC combinations; and receiving, from the network node, a UE radio capability inquiry based on transmitting the request, wherein the UE transmits the indication of the second UE radio capability based on receiving the UE radio capability inquiry.

Aspect 6. The method of any one of Aspects 1-5, further comprising determining the actual data throughput metric satisfies the failure condition based on the actual data throughput metric being less than the data throughput threshold value for a period of time.

Aspect 7. The method of any one of Aspects 1-6, further comprising measuring the data throughput metric at different instances of time.

Aspect 8. The method of Aspects 7, wherein each instance of time of the different instances of time corresponds to a channel condition associated with the active EN-DC band combination.

Aspect 9. A method of wireless communication performed by a UE, comprising: transmitting, to a first network node, an indication of a first UE radio capability, the first UE radio capability indicating support for a plurality of EN-DC band combinations; receiving, from the first network node, an indication of an active EN-DC band combination of the plurality of EN-DC band combinations based on transmitting the indication of the first UE radio capability; transmitting, to a second network node, a data throughput metric associated with the active EN-DC band combination; receiving, from the second network node, an indication of one or more non-active EN-DC combinations of the plurality of EN-DC band combinations based on transmitting the actual data throughput metric, each one of the one or more non-active EN-DC combinations associated with a respective potential data throughput metric, of a plurality of potential data throughput metrics, that is greater than a data throughput threshold value; and transmitting, to the first network node based on the actual data throughput metric satisfying a failure condition, an indication of a second UE radio capability, the second UE radio capability indicating support for the one or more non-active EN-DC combinations.

Aspect 10. The method of Aspect 9, wherein: each EN-DC band combination of the plurality of EN-DC band combinations comprises a first RAT band and a second RAT band; and the second RAT band comprises one or both of a FDD band or a TDD band.

Aspect 11. The method of Aspect 10, wherein the first RAT band is an LTE band and the second RAT band is a NR sub-6 GHz band or an NR millimeter wave band.

Aspect 12. The method of any one of Aspects 9-11, further comprising: transmitting, to the first network device, a request for a UE radio capability update based on receiving the indication from the second network device; and receiving, from the first network device, a UE radio capability inquiry based on transmitting the request, wherein the UE transmits the indication of the second UE radio capability based on receiving the UE radio capability inquiry.

Aspect 13. The method of any one of Aspects 9-12, wherein: the first network node is a base station; and the second network node is a network server device.

Aspect 14. The method of any one of Aspects 9-13, further comprising measuring the data throughput metric at different instances of time.

Aspect 15. The method of Aspect 14, wherein each instance of time of the different instances of time corresponds to a channel condition associated with the active EN-DC band combination.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, or a combination of hardware and software. As used, a processor is implemented in hardware, firmware, or a combination of hardware and software.

It will be apparent that systems or methods described may be implemented in different forms of hardware, firmware, or a combination of hardware and software. The actual specialized control hardware or software code used to implement these systems or methods is not limiting of the aspects. Thus, the operation and behavior of the systems or methods were described without reference to specific software code—it being understood that software and hardware can be designed to implement the systems or methods based, at least in part, on the description.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed may be implemented as electronic hardware, firmware, software, or combinations of hardware, firmware, or software, including the structures disclosed in this specification and the structural equivalents thereof. The interchangeability of hardware, firmware, and software has been described generally, in terms of functionality, and illustrated in the various illustrative components, blocks, modules, circuits, and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined may be applied to other implementations without departing from the spirit or scope of this disclosure. Thus, the claims are not intended to be limited to the implementations shown, but are to be accorded the widest scope consistent with this disclosure, the principles and the novel features disclosed.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication performed at a user equipment (UE), comprising:

transmitting, to a network node, a first indication of a first UE radio capability, the first UE radio capability indicating the UE supports a plurality of evolved universal terrestrial radio access network (E-UTRAN) new radio (NR) dual connectivity (EN-DC) band combinations;

receiving, from the network node, a second indication of an active EN-DC band combination of the plurality of EN-DC band combinations based on transmitting the first indication of the first UE radio capability; and transmitting, to the network node, that received the first indication, based on an actual data throughput metric associated with the active EN-DC band combination being less than a data throughput threshold value, a third indication of a second UE radio capability indicating the UE supports one or more non-active EN-DC combinations of the plurality of EN-DC band combinations, each one of the one or more non-active EN-DC combinations being associated with a respective potential data throughput metric, of a plurality of potential data throughput metrics, that is greater than the data throughput threshold value.

2. The method of claim 1, wherein:

each EN-DC band combination of the plurality of EN-DC band combinations comprises a first radio access technology (RAT) band and a second RAT band; and the second RAT band comprises one or both of a frequency division duplexing (FDD) band or a time division duplexing (TDD) band.

3. The method of claim 2, wherein the first RAT band is a long-term evolution (LTE) band and the second RAT band is a new radio (NR) sub-6 GHz band or an NR millimeter wave band.

4. The method of claim 1, further comprising identifying the one or more non-active EN-DC combinations based on the plurality of potential data throughput metrics and the actual data throughput metric.

5. The method of claim 4, further comprising:

transmitting, to the network node, a request for a UE radio capability update based on identifying the one or more non-active EN-DC combinations; and receiving, from the network node, a UE radio capability inquiry based on transmitting the request, wherein the UE transmits the third indication of the second UE radio capability based on receiving the UE radio capability inquiry.

6. The method of claim 1, wherein the third indication is transmitted based on the actual data throughput metric being less than the data throughput threshold value for a period of time.

7. The method of claim 1, further comprising measuring the actual data throughput metric at different instances of time.

8. The method of claim 7, wherein each instance of time of the different instances of time corresponds to a channel condition associated with the active EN-DC band combination.

9. An apparatus for wireless communications at a user equipment (UE), comprising:

at least one processor; and at least one memory coupled with the at least one processor and storing instructions operable, when executed by the at least one processor, to cause the apparatus to:

transmit, to a network node, a first indication of a first UE radio capability, the first UE radio capability indicating the UE supports for a plurality of evolved universal terrestrial radio access network (E-UTRAN) new radio (NR) dual connectivity (EN-DC) band combinations;

receive, from the network node, a second indication of an active EN-DC band combination of the plurality of EN-DC band combinations based on transmitting the first indication of the first UE radio capability; and transmit, to the network node, that received the first indication, based on an actual data throughput metric associated with the active EN-DC band combination being less than a data throughput threshold value, a third indication of a second UE radio capability indicating the UE supports one or more non-active EN-DC combinations of the plurality of EN-DC band combinations, each one of the one or more non-active EN-DC combinations being associated with a respective potential data throughput metric, of a plurality of potential data throughput metrics, that is greater than the data throughput threshold value.

10. The apparatus of claim 9, wherein:

each EN-DC band combination of the plurality of EN-DC band combinations comprises a first radio access technology (RAT) band and a second RAT band; and the second RAT band comprises one or both of a frequency division duplexing (FDD) band or a time division duplexing (TDD) band.

11. The apparatus of claim 10, wherein the first RAT band is a long-term evolution (LTE) band and the second RAT band is a new radio (NR) sub-6 GHz band or an NR millimeter wave band.

12. The apparatus of claim 9, wherein execution of the instructions further cause the apparatus to identify the one or more non-active EN-DC combinations based on the plurality of potential data throughput metrics and the actual data throughput metric.

13. The apparatus of claim 12, wherein execution of the instructions further cause the apparatus to:

transmit, to the network node, a request for a UE radio capability update based on identifying the one or more non-active EN-DC combinations; and receive, from the network node, a UE radio capability inquiry based on transmitting the request, wherein the UE transmits the third indication of the second UE radio capability based on receiving the UE radio capability inquiry.

14. The apparatus of claim 9, wherein the third indication is transmitted based on the actual data throughput metric being less than the data throughput threshold value for a period of time.

15. The apparatus of claim 9, wherein execution of the instructions further cause the apparatus to measure the actual data throughput metric at different instances of time.

16. The apparatus of claim 15, wherein each instance of time of the different instances of time corresponds to a channel condition associated with the active EN-DC band combination.

17. A method of wireless communication performed by a user equipment (UE), comprising:

transmitting, to a first network node, a first indication of a first UE radio capability, the first UE radio capability indicating support for a plurality of evolved universal terrestrial radio access network (E-UTRAN) new radio (NR) dual connectivity (EN-DC) band combinations;

receiving, from the first network node, a second indication of an active EN-DC band combination of the plurality of EN-DC band combinations based on transmitting the first indication of the first UE radio capability;

transmitting, to a second network node, an actual data throughput metric associated with the active EN-DC band combination;

receiving, from the second network node, a third indication of one or more non-active EN-DC combinations of the plurality of EN-DC band combinations based on transmitting the actual data throughput metric, each one of the one or more non-active EN-DC combinations associated with a respective potential data throughput metric, of a plurality of potential data throughput metrics, that is greater than a data throughput threshold value; and transmitting, to the first network node based on the actual data throughput metric satisfying a failure condition, a fourth indication of a second UE radio capability, the second UE radio capability indicating support for the one or more non-active EN-DC combinations.

18. The method of claim 17, wherein:

each EN-DC band combination of the plurality of EN-DC band combinations comprises a first radio access technology (RAT) band and a second RAT band; and the second RAT band comprises one or both of a frequency division duplexing (FDD) band or a time division duplexing (TDD) band.

19. The method of claim 18, wherein the first RAT band is a long-term evolution (LTE) band and the second RAT band is a new radio (NR) sub-6 GHz band or an NR millimeter wave band.

20. The method of claim 17, further comprising:

transmitting, to the first network node, a request for a UE radio capability update based on receiving the third indication from the second network node; and receiving, from the first network node, a UE radio capability inquiry based on transmitting the request, wherein the UE transmits the fourth indication of the second UE radio capability based on receiving the UE radio capability inquiry.

21. The method of claim 17, wherein:

the first network node is a base station; and the second network node is a network server device.

22. The method of claim 17, further comprising measuring the actual data throughput metric at different instances of time.

23. The method of claim 22, wherein each instance of time of the different instances of time corresponds to a channel condition associated with the active EN-DC band combination.

24. An apparatus for wireless communications at a user equipment (UE), comprising:

at least one processor; and at least one memory coupled with the at least one processor and storing instructions operable, when executed by the at least one processor, to cause the apparatus to:

transmit, to a first network node, a first indication of a first UE radio capability, the first UE radio capability indicating support for a plurality of evolved universal terrestrial radio access network (E-UTRAN) new radio (NR) dual connectivity (EN-DC) band combinations;

receive, from the first network node, a second indication of an active EN-DC band combination of the plurality of EN-DC band combinations based on transmitting the first indication of the first UE radio capability;

transmit, to a second network node, an actual data throughput metric associated with the active EN-DC band combination;

receive, from the second network node, a third indication of one or more non-active EN-DC combinations of the plurality of EN-DC band combinations based on transmitting the actual data throughput metric, each one of the one or more non-active EN-DC combinations associated with a respective potential data throughput metric, of a plurality of potential data throughput metrics, that is greater than a data throughput threshold value; and transmit, to the first network node based on the actual data throughput metric satisfying a failure condition, a fourth indication of a second UE radio capability, the second UE radio capability indicating support for the one or more non-active EN-DC combinations.

25. The apparatus of claim 24, wherein:

each EN-DC band combination of the plurality of EN-DC band combinations comprises a first radio access technology (RAT) band and a second RAT band; and the second RAT band comprises one or both of a frequency division duplexing (FDD) band or a time division duplexing (TDD) band.

26. The apparatus of claim 25, wherein the first RAT band is a long-term evolution (LTE) band and the second RAT band is a new radio (NR) sub-6 GHz band or an NR millimeter wave band.

27. The apparatus of claim 24, wherein execution of the instructions further cause the apparatus to:

transmit, to the first network node, a request for a UE radio capability update based on receiving the third indication from the second network node; and receive, from the first network node, a UE radio capability inquiry based on transmitting the request, wherein the UE transmits the fourth indication of the second UE radio capability based on receiving the UE radio capability inquiry.

28. The apparatus of claim 24, wherein:

the first network node is a base station; and the second network node is a network server device.

29. The apparatus of claim 24, wherein execution of the instructions further cause the apparatus to measure the actual data throughput metric at different instances of time.

30. The apparatus of claim 29, wherein each instance of time of the different instances of time corresponds to a channel condition associated with the active EN-DC band combination.

* * * * *